United States Patent [19]

Kurita

[11] 4,216,028
[45] Aug. 5, 1980

[54] THERMOCOUPLE PROTECTING TUBE

[75] Inventor: Sumihiko Kurita, Arita, Japan

[73] Assignee: Koransha Co., Ltd., Arita, Japan

[21] Appl. No.: 932,169

[22] Filed: Aug. 9, 1978

Related U.S. Application Data

[62] Division of Ser. No. 831,313, Sep. 7, 1977, Pat. No. 4,135,538.

[30] Foreign Application Priority Data

Nov. 30, 1976 [JP] Japan ................... 51/160660

[51] Int. Cl.² .......................................... H01L 35/02
[52] U.S. Cl. ................................................. 136/234
[58] Field of Search .......................... 106/66; 136/234

[56] References Cited

U.S. PATENT DOCUMENTS

| | | | |
|---|---|---|---|
| 3,379,578 | 4/1968 | McTaggart et al. | 136/234 |
| 3,467,542 | 9/1969 | Nordlie | 136/234 X |
| 3,610,045 | 10/1971 | Shearman | 136/234 X |
| 3,717,497 | 2/1973 | Stradley et al. | 106/66 X |

OTHER PUBLICATIONS

Winkler, Blast Furnace and Steel Plant, May, 1949, pp. 536 to 538.

*Primary Examiner*—Leland A. Sebastian
*Attorney, Agent, or Firm*—Jordan and Hamburg

[57] ABSTRACT

The thermocouple protecting tube of this invention is characterized by having a heat-insulating layer in an annular space formed by and between an inner ceramic tube and an outer silica glass tube which are concentrically disposed within each other. Due to the above construction, the protecting tube can withstand the thermal shock which it receives when immersed in a molten body of high temperature and accordingly the thermocouple enclosed in the protecting tube can continuously measure the temperature of molten steel for a considerable length of time.

3 Claims, 7 Drawing Figures

THERMOCOUPLE PROTECTING TUBE

This is a division of application Ser. No. 831,313, filed Sept. 7, 1977 now U.S. Pat. No. 4,135,538, issued Jan. 23, 1979.

BACKGROUND OF INVENTION

This invention relates to a thermocouple protecting tube which can withstand the temperature measuring operation within molten metal for many hours, thereby providing for the continuous measuring of the temperature of molten metal with high precision.

With the increase of continuous casting facilities in steel making plants, the continuous measuring of the temperature of molten metal has become a matter of vital importance.

The purposes for continuous temperature measurement of molten steel may vary depending on the particular steel making plant; however, in general, the purposes can be summarized as involving quality control and the lowering of production costs.

For quality control, continuous measuring is effective in the production of metal having a uniform quality and for the prevention of segregation within the metal. Furthermore, continuous measuring facilitates the refining operation since the temperature of molten metal can be continuously measured.

With a view toward lowering of production costs, continuous measuring enables the complete computarization of the control of the refining operation and also improves the drawing speed of the continuous casting operation.

Conventionally, for measuring the temperature of molten steel, ceramic-made thermocouple protecting tubes, especially alumina protecting tubes, have been predominantly used.

In general, ceramics (sintered ceramics) used for the above purpose are easily harmed by thermal; in fact, a sharp rise or fall of temperature causes the rupture thereof.

However, the above ceramics have a rather high heat resistance, and they can withstand a temperature of up to 2000° C.

This heat resistance employed hereunder implies erosion resistance against molten metal, molten slag, molten glass or other chemicals of high temperature, loading resistance and fluidity resistance at a high temperature.

The basic concept of this invention involves the use of such ceramics, which have high heat resistance and low thermal shock resistance for producing a thermocouple protecting tube, which can be used for the continuous measurement of the temperature of a molten body for a considerable length of time under conditions of immersion.

The applicant of this invention has previously filed several patent applications such as U.S. Pat. Application Ser. No. 715,023, now U.S. Pat. No. 4,060,095, related to thermocouple protecting tubes, wherein the following provisions for protecting the ceramic thermocouple protecting tube from rupture caused by thermal shock have been disclosed, namely:

(1) coating a refractory powder onto the outer surface of the ceramic tube, (2) providing a silica glass tube concentrically over the ceramic tube.

Although, the above ceramic tubes are effective when their diameter is small, it has been found that they tend to rupture when their diameter becomes large.

For example, when an alumina tube containing $Cr_2O_3$ in an amount of 5% by weight and having an outer diameter of 5 mm, an inner diameter of 5 mm and a wall thickness of 2.5 mm (the tube of this composition has been specifically developed for the purpose of this invention and accordingly forms a part of this invention) was provided with either conventional provision 1 or 2 and subsequently immersed in molten steel at about 1500° C., the mean lifetime of this thermocouple protecting tube was about 150 to 180 minutes at maximum, due to the erosion caused by molten slag floating on the molten steel.

To prolong the lifetime of the thermocouple and thus facilitate the more complete operation thereof, the tube must be more resistant to erosion by molten slag, and this can be achieved only by making the wall of the tube thicker.

However, the tube must accommodate the plutinum thermocouple element therein, and therefore the inner diameter of the tube must be at least more than 5 to 6 mm.

Accordingly, the tube must have an increased outer diameter to provide for a thicker tube wall, e.g. from the conventional 10 mm to 12 or 14 mm.

However, as described above, it has been found that in proportion to the increase of the outer diameter, the thermal shock resistance of the tube decreases by the square value of the outer diameter, and thus provisions 1 and 2 cannot protect tubes of increased outer diameter from rupturing.

To be more specific, the maximum outer diameters that are available for provisions 1 and 2 are 10 mm and 12 mm respectively. When the outer diameter of the tubes exceeds the above values, the tubes rupture, even if they are preheated before they are immersed in a molten body.

In the case of provision 1, when a tube having an outer diameter greater than the allowable diameter was immersed in molten steel at above 1500° C., the coating layer of the tube peeled off or the temperature of the tube sharply rose due to heat transfer through the coating layer.

In the case of provision 2, when a tube of excessive diameter was immersed in molten steel, the silica glass tube which is disposed over the ceramic tube was softened by the heat of the molten steel and subsequently adhered to the ceramic tube due to the buoyancy of the molten steel, whereby the temperature of the ceramic thermocouple protecting tube sharply increased. That is, the air layer (low heat conducting layer) disposed between the ceramic tube and the outer silica glass tube, which reduced the rate of heat transfer within a limited range, was not sufficiently effective, thereby the tube ruptured.

Furthermore, since the silica glass was transparent or semi-transparent, the glass tended to transfer the radiation heat readily.

It is believed that the temperature of the ceramic thermocouple protecting tube rose sharply when it was provided with either of two provisions due to the above two unfavorable phenomena discussed above and accordingly, a tube of excessive diameter could not withstand or absorb thermal shock and ruptured.

SUMMARY OF THE INVENTION

It is an object of the present invention to provide a thermocouple protecting tube of triplicate concentric construction which can withstand thermal shock and can resolve the aforementioned defects of conventional tubes used in the continuous temperature measurement of molten steel for a considerable time.

It is another object of the present invention to provide a thermocouple protecting tube which enables a thermocouple element to measure the temperature of molten steel accurately.

It is still another object of the present invention to provide a thermocouple protecting tube which can be easily manufactured.

According to the invention, the thermocouple protecting tube for continuously measuring the temperature of molten steel comprises:
(a) an inner ceramic tube having one end closed, and containing a thermocouple element therein,
(b) an outer silica glass tube disposed concentrically over the inner ceramic tube and over the one closed end of the inner tube forming an annular space therebetween, and
(c) an intermediate heat-insulating layer within the annular space.

DETAILED DESCRIPTION OF THE DISCLOSURE

Figure 1:
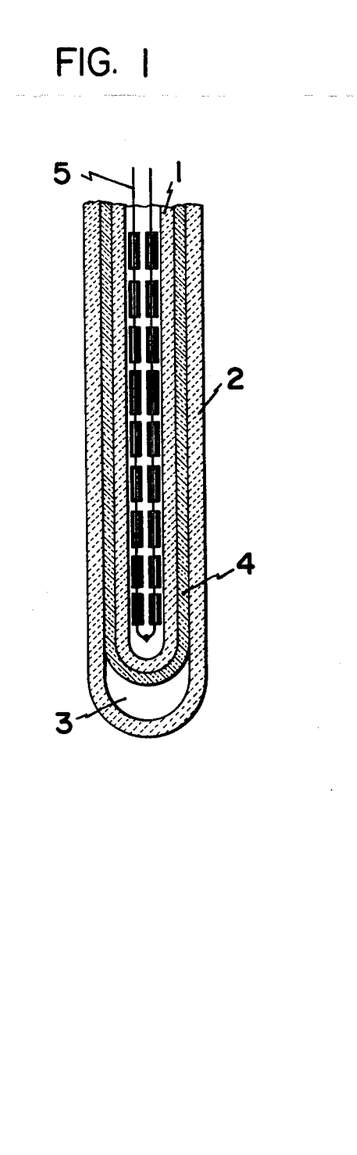
FIG. 1 is a front sectional view of the thermocouple protecting tube of this invention.

As shown in FIG. 1, a silica glass tube 2 is disposed over and around an inner ceramic tube 1 made of metal oxide, metal carbide, metal nitride or a mixture of above components, forming a desired annular space 3 therebetween. In the above space 3, a heat-resistant insulating layer 4 is formed. The thermocouple element 5 is disposed in the inner ceramic tube 1. As for the material of the heat-resistant layer 4, a ceramic paper or ceramic fiber which is wound around the inenr ceramic tube 1, refractory powder, or cement can be considered.

As for the material of the ceramic protecting 1, a metal oxide (e.g. alumina, beryllia, magnesia) can be considered.

Furthermore, ceramic carbide (e.g. silica carbide), nitride carbide and a mixture of these components are also useful materials for the ceramic protecting tube 1.

In other words, according to this invention, any ceramics which have a low thermal shock resistance can be employed as the material for the thermocouple protecting tube, which is immersed into a molten body of high temperature.

The rupture of the above constructed tube can be prevented by simply increasing the thickness of the insulating layer 4, which can reduce the rate of the temperature rise of protecting tube 1.

The ceramic paper employed herein is produced by first gathering ceramic, oriented, heat resistant fibers to form a cotton-like body and subsequently adding a small amount of binder to the cotton-like body so as to form a paper-like material.

The thermocouple protecting tube of this invention is described hereinafter in the light of four examples wherein all examples use the following same ceramic tube 1, silica glass tube 2 and plutinum element 5.

(1) Ceramic thermocouple protecting tube 1:
alumina which contains chromium oxide

| composition: | $Al_2O_3$ | $Cr_2O_3$ | MgO | Impurities |
|---|---|---|---|---|
| % by weight: | 94.44 | 5.0 | 0.05 | 0.01 |

These components were grained, shaped and sintered by conventional methods.
size outer diameter 14 mm
inner diameter: 6 mm
one end closed (2) Silica glass tube 2:
non-transparent silica glass (Toshiba ceramics S-19#)

| size | inner diameter: | 19.5 | 0.5mm |
|---|---|---|---|
| | wall thickness: | 1.8 | 0.5mm | one end closed by a gas burner (3) Thermocouple plutinum element 5 (PR-13%):
size wire diameter: 0.5 mm
insulating tube enclosing the element
outer diameter: 1.2 mm
inner diameter: 0.8 mm
composition of tube: alumina ($Al_2O_3$ 99.5%)

(4) Molten steel:
molten steel received in a tundish of a continuous casting machine

EXAMPLE 1

Alumina powder (Showa Denko A-42) in an amount of 100 parts by weight, aluminum phosphate in an amount of 25 parts by weight and water in an amount of 30 parts by weight were mixed together within a mortar, to form a liquid mixture.

A ceramic inner tube was soaked in the above liquid mixture and then was dried, after being removed from the mortar.

The above operation were repeated until a layer 4 of about 2 mm compound of the mixture of alumina and aluminum phosphate was formed uniformly around the ceramic inner tube 1.

Subsequently, the thus coated inner tube 1 was left in a room for about three days to dry.

Then a silica glass tube 3 was concentrically disposed over the above prepared inner ceramic tube forming a thermocouple protecting tube of this invention as shown in FIG. 1.

The protecting tube was constructed so that the insulating layer 4 (alumina powder coating layer) was disposed concentrically over the ceramic protecting tube, and furthermore the silica glass outer tube 2 was disposed over the above insulating layer 4.

After constructing the protecting tube in the above manner, a plutinum element 5 was inserted into the tube.

The thus prepared tube was directly immersed in molten steel of about 1520° C.

Figure 2:
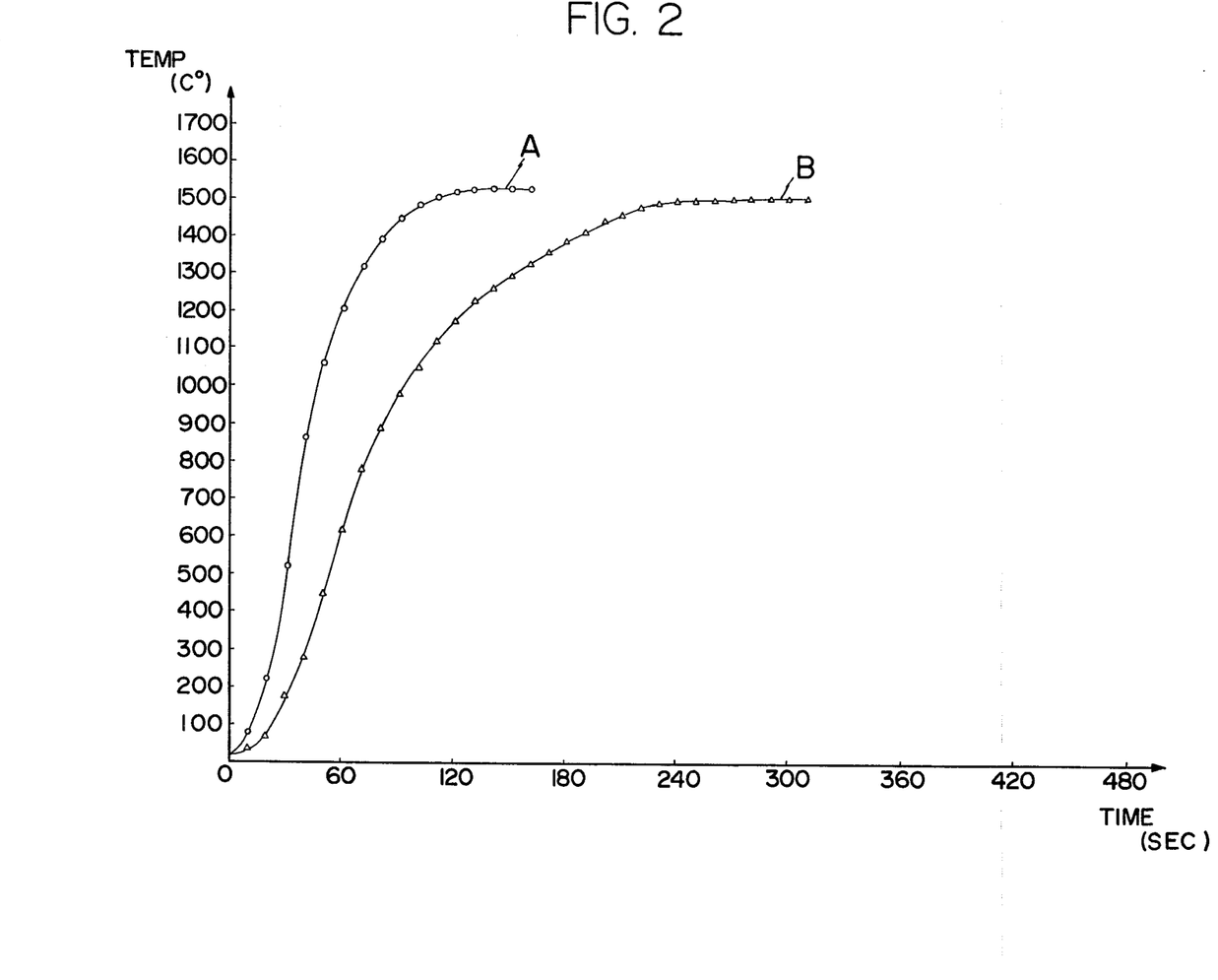
FIG. 2 to FIG. 5 are diagrams showing the temperature elevation curves of the protecting tube of the first to fourth examples.

In FIG. 2, the temperature elevation curve of this protecting tube is shown as curve B, while the temperature elevation curve of a protecting tube, which is constructed by merely disposing the silica glass tube over the ceramic protecting tube, is shown as curve A. In other words, the latter tube was not provided with an intermediate layer 4.

Upon comparing curve A and curve B, curve A of the tube which has no intermediate layer 4 shows an acute elevation in the temperature of the tube (namely, the temperature reached 1200° C., 60 seconds after it was immersed in molten steel); while the tube of curve B, which is provided with the alumina-powder coating 4 between the ceramic protecting tube 1 and the silica glass tube 2 does not show the above acute elevation, but a gradual elevation of the temperature of the tube. Namely, with respect to the latter tube, the speed of temperature elevation speed was reduced by the provision of the intermediate layer 4.

The tube of curve A showed an excessively fast temperature elevation with the result that cracks occurred within the inner ceramic tube. Accordingly, the temperature measuring operation by this tube was interrupted as soon as the silica glass tube melted away and the lifetime of the tube was only 15 minutes.

On the other hand, the tube of curve B could continue an accurate temperature measuring operation for more than six and a half (6½) hours without being eroded by molten slag after the tube was immersed in molten steel.

Accordingly, protecting tubes of large diameter and large thickness having conventional construction which have ruptured can now withstand thermal shock for a long time and thus a long and accurate temperature measuring operation can be carried out.

EXAMPLE 2

A ceramic paper of the following particulars was wound twice around the ceramic tube 1 including the closed end thereof and this paper-coated ceramic tube was concentrically disposed within a silica glass tube 4. The thus prepared protecting tube was immersed in molten steel at about 1520° C.

Particulars of ceramic paper—
Manufacturer: Japan Asbestos Co., Ltd.
Trademark: Finelex 1500

| Composition % by weight: | $Al_2O_3$ 64.12 | $SiO_2$ 35.68 | $Na_2O$ 0.04 | $Fe_2O_3$ 0.02 |
| --- | --- | --- | --- | --- |

The fibers of 3.6μ, each of which has the above composition were bound with an organic binder and the thus bound material was manufactured into papers by a paper making device.

Figure 3:
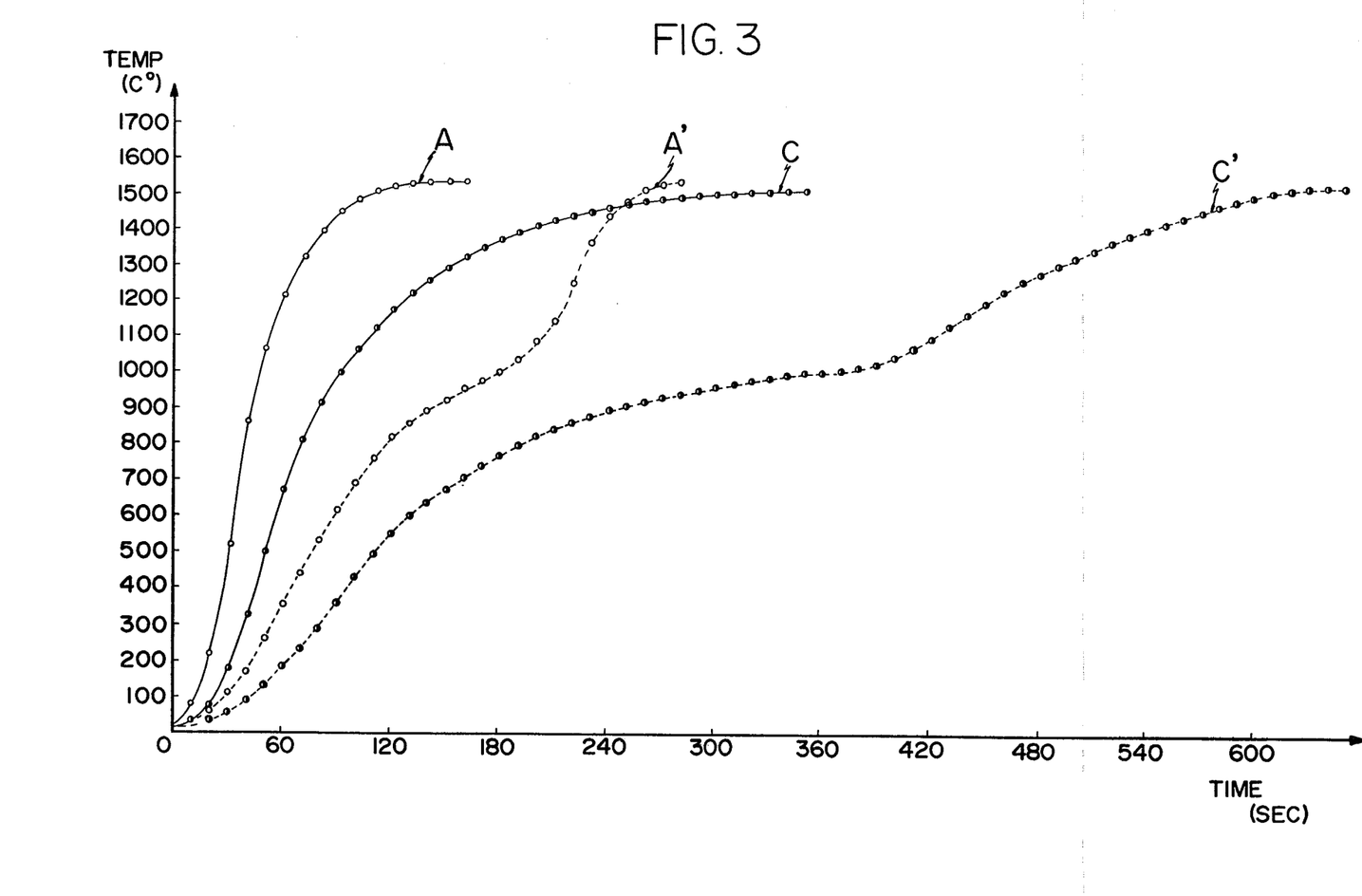

In FIG. 3, four curves A, A', C and C' are described wherein curves A and A' were those of protecting tubes which are made by disposing only the silica glass tube over the ceramic tube.

Curve A corresponds to the curve A of FIG. 2 and is shown for reference purpose.

Curve A' and C' were obtained by carrying out the Example in such a way that the tubes were preheated within the atmosphere of the tundish until the temperature of the tubes reached 1000° C. As soon as the above temperature was obtained, the tubes were immersed in molten steel.

Curves A and C are temperature elevation curves derived by directly immersing the tubes in molten steel.

Upon reviewing the curves A and C (direct immersing), curve A reached 1200° C., 60 seconds after the immersing operation as previously mentioned, whereas curve C of the protecting tube which had been wound twice with ceramic paper (4 mm in total thickness) reached 670° C., 60 seconds after the immersing operation. Thus curve C showed a slower temperature elevation than curve A.

Accordingly, the tube of curve A could be used to carry out a continuous measuring operation for only about 15 minutes, whereas the tube of curve C, which was provided with the ceramic paper made intermediate layer 4, could be used to carry out a continuous measuring operation for more than 7 hours.

Upon reviewing curves A' and C' (both being preheated up to 1000° C.), curve A' reached 1000° C. about 180 seconds after the tube was disposed into the tundish atmosphere, whereas curve C' reached 1000° C. about 370 seconds after the tube was disposed within the above atmosphere.

In this way, the effect of the ceramic paper intermediate layer 4 also can be judged by the differences of the above temperature curves even at the preheating stage of the temperature measuring operation.

Furthermore, FIG. 3 also shows that curve A' took about 80 seconds to provide the temperature elevation of 1000° C. to 1500° C. whereas curve C' necessitated more than 240 seconds to reach the above temperature increase.

Notwithstanding that the tube of curve A' was preheated to 1000° C., the tube could withstand the continuous measuring operation for only 12 minutes.

This implies that the temperature of the above tube sharply increased even when the tube was immersed in molten steel after the preheating operation, so that cracks occurred in ceramic inner tube 1 resulting in the short temperature measuring operation.

On the other hand, the tube provided with the ceramic paper 4, which works as an insulating material, could continue measuring the temperature of molten steel for more than 7 hours.

Furthermore, it is considered that the tube which may be wound by a cloth made of ceramic fiber or glass fiber has the same effect as that of the previously discussed ceramic-paper-wound tube.

EXAMPLE 3

This example relates to a protecting tube which is constructed by coating an alumina cement on a ceramic inner tube and subsequently concentrically enclosing the alumina-coated inner tube with a silica glass outer tube.

The coating of the alumina cement was carried out as follows.

(1) Alumina cement in an amount of 100 parts by weight and water in an amount of 30 parts by weight were mixed together.
(2) A cylinder having an inner diameter sufficient to provide a cement coating of 2 mm thickness on the surface of the ceramic tube was formed by a polyester plate.
(3) The cylinder was placed on the clay.
(4) The ceramic tube was concentrically inserted into the cylinder until the lower closed end thereof was slightly above the clay surface.

(5) While maintaining the ceramic tube in the above position, the liquid cement was filled in the space between the inner ceramic tube and outer cylinder so that the liquified cement covered the bottom round portion of the ceramic tube.

(6) Next day, the cylinder was removed from the inner tube.

(7) Subsequently, the silica glass tube concentrically enclosed the alumina cement coated inner tube.

Figure 4:
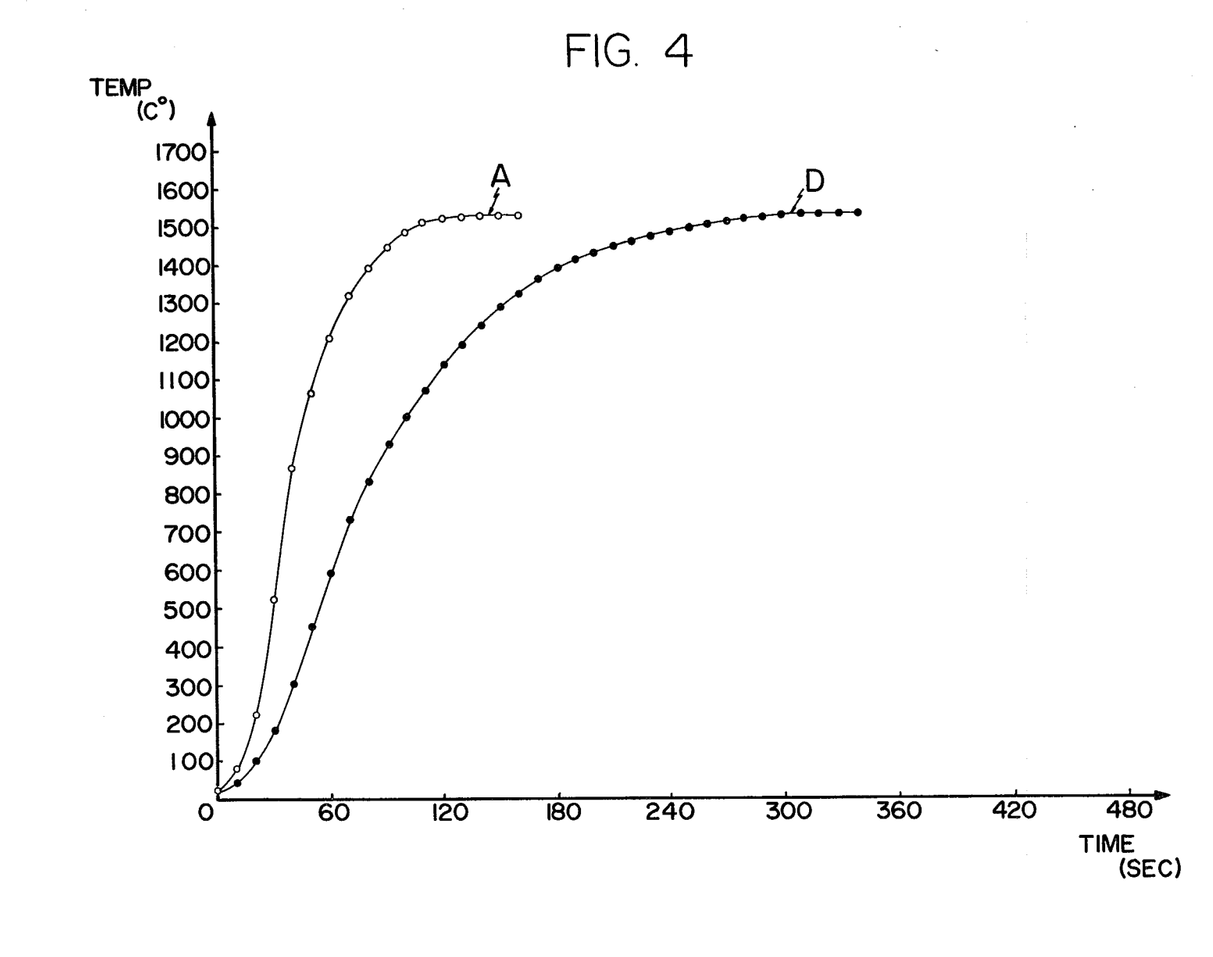

The thermocouple protecting tube which was made in the above manner was immersed in molten steel of about 1520° C., wherein FIG. 4 shows the temperature elevation curve D of the above tube and that of the conventional curve A.

Upon reviewing the above curve A and the curve D, the temperature of the curve A reached 1200° C., 60 seconds after the tube was immersed in molten steel, whereas the temperature of the curve D reached only 600° C. 60 seconds after immersing the tube. Therefore, the latter tube had a slower temperature elevation than the former one. Accordingly, even when the tube was subjected to thermal shock, no cracks occurred in the inner ceramic tube and the tube could carrying out a continuous temperture measurement for about 6 hours, whereas the tube of curve A could measure the temperature for only 15 minutes.

Therefore, it is safe to say that the tube constructed by enclosing a cement coated ceramic tube in a silica glass tube is highly effective for measuring the temperature of molten steel, since the cement works as an insulating material to absorb the thermal shock which tends to rupture the ceramic protecting tube.

EXAMPLE 4

Figure 5:
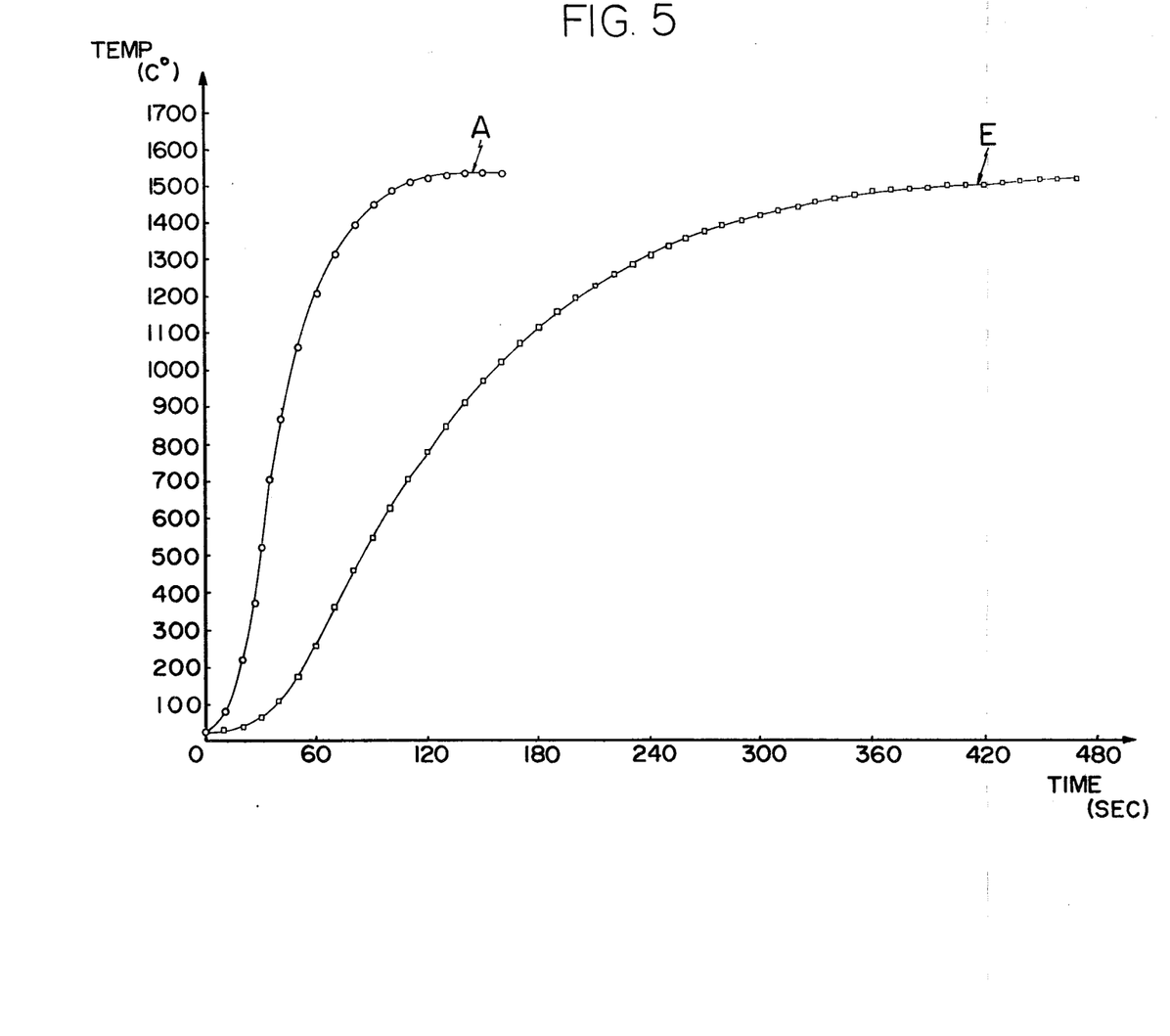

This example relates to a thermocouple protecting tube which is constructed by filling a desired amount of alumina powder in the space formed by and between an inner ceramic tube and an outer silica glass tube, which tubes are arranged concentrically. FIG. 5 shows the temperature elevation curve E of this tube and curve A of a conventional tube.

Upon reviewing these two curves, the temperature of curve A reached 1200° C., 60 seconds after the tube was immersed in molten steel, while it took 106 seconds to reach 1500° C. Whereas the temperature of curve E reached a mere 250° C. in the original immersing and it took about 420 seconds to reach 1500° C.

Accordingly, no cracks occurred in the tube of curve E when the tube was immersed in molten steel so that the tube could carry out the continuous-measurement of temperature for more than 7 hours. As has been described heretofore, the tube of curve A could measure the temperature for only 15 minutes.

Therefore, it is believe that the thermal shock that the ceramic protecting tube received was absorbed by the alumina powder filled in the space formed between inner and outer tubes.

Figure 6:
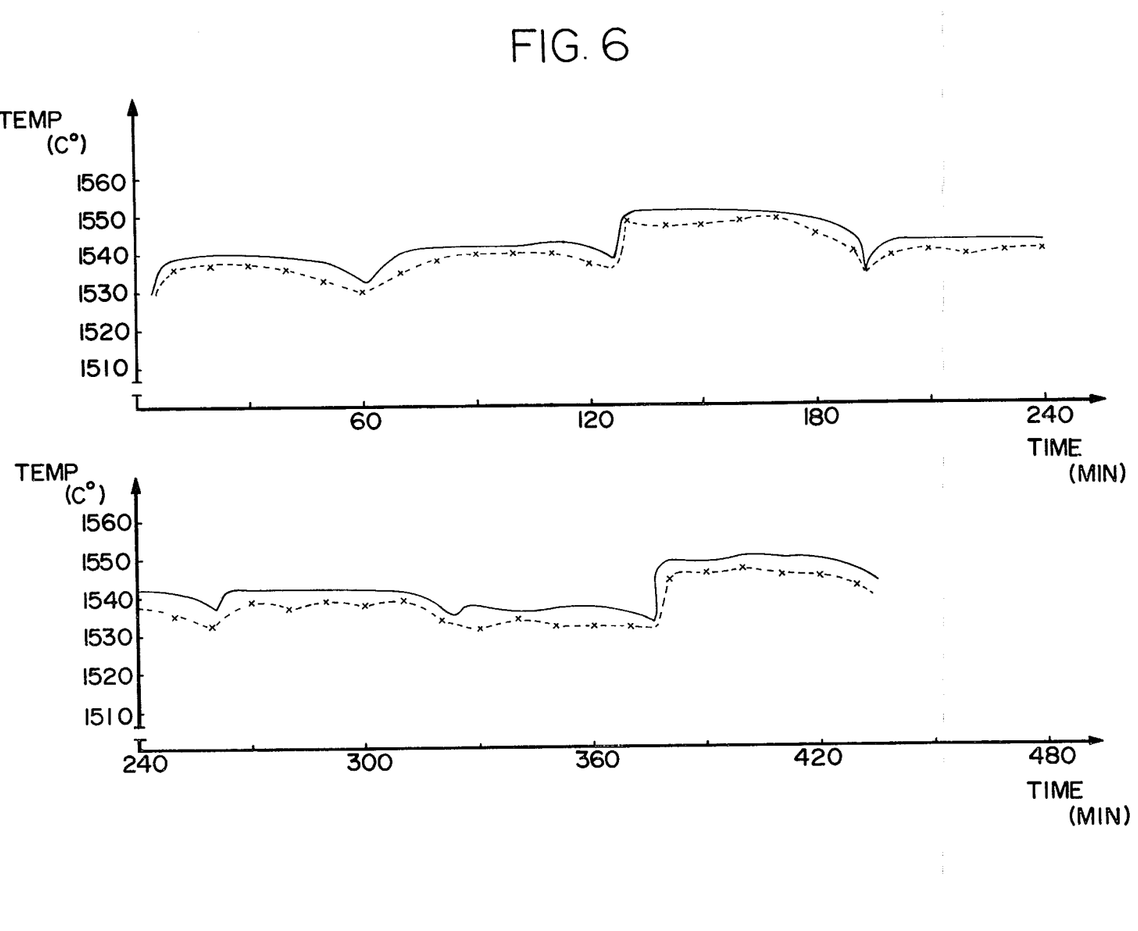
FIG. 6 is a diagram showing the measured temperature curves of a conventional tube and of the tube of this invention respectively.

Furthermore, to investigate the accuracy of the temperature measurement and the retarding effect of the protecting tube of the first example, the temperature measured by the protecting tube of this invention and the temperature measured by the conventional tube were graphically compared in FIG. 6.

The conventional tubes could carry out only instantaneous temperature measurements and accordingly the measured temperatures were designated by "X". These designated temperatures were connected by a dotted line for convenience in evaluating the comparison chart hereunder. It is also to be noted that the periodical reductions of measured temperature in the chart (FIG. 6) were the temperatures measured when the tundish was about to be tapped with fresh molten steel from a ladle.

As can be clearly observed from FIG. 6, the thermocouple protecting tube of this invention can carry out accurate temperature measurements for a long time, provided that the thickness of the tube, which is 4 mm before the measuring operation, is reduced to 2.8 mm in the final stage of the measuring operation.

As has been described heretofore, due to the provision of the intermediate layer which is placed between two concentric tubes, the inner ceramic tube and the outer silica glass tube, the temperature elevation speed of the thermocouple protecting tube can be reduced so as to by as slow as possible. Thus, a tube of large diameter, which conventionally ruptured easily when it received a thermal shock can now be used for temperature measuring purposes.

Of course, it is needless to say that a ceramic, which is of high heat resistance but of low thermal shock resistance, can be used as the material for thermocouple protecting tubes.

It is also contemplated that the temperature elevation speed can be changed at will by merely changing the thickness the material of the insulating layer.

As previously discussed, an alumina ceramic tube (containing $Cr_2O_3$ in an amount of 5% by weight) which has been either coated with refractory powder or enclosed by a silica glass tube can be used as the thermocouple protecting tube to be immersed in molten steel, provided that the diameter and the thickness thereof is a maximum of 10 mm and 12 mm respectively. Therefore, this protecting tube can conduct a continuous measuring operation of molten steel only for 150 to 180 minutes after being immersed in the tundish.

Whereas with the provision of this invention, the diameter and the thickness of the protecting tube can be increased to 14 mm and 4 mm respectively, whereby the lifetime of the protecting tube for continuously measuring the temperature of molten steel is greatly prolonged, namely more than 7 hours. This implies that a single protecting tube is sufficient to measure the temperature change of molten steel during the whole steel making operation.

Accordingly, the thermocouple protecting tube of this invention has the following advantages.

(1) Since the continuous temperature measuring operation can be effected by a single protecting tube, the cost for the measuring operation can be greatly reduced.

Normally when a protecting tube of conventional construction is used for the temperature measuring operation at least 3 protecting tubes are required for continuous measuring over a period of seven hours, whereas a single protecting tube of this invention is sufficient to cover the this operation. In addition, the dangerous operations of immersing and removing the tube into and from a molten body can be reduced.

(2) Since the protecting tube of this invention has a large diameter (or large thickness), the lifetime of the tube can be prolonged.

Thus, the above protecting tube can protect the ceramic tube from rupturing.

(3) Due to the provision of the insulation layer which is formed by inserting the insulating material between the inner ceramic tube and the outer silica glass, the erosion of the tube, which occurs due to molten slag, can be prevented resulting in a prolonged lifetime of the protecting tube.

(4) The rupture of the thermocouple protecting tube by thermal deflection, which occurs when there is a temperature difference between the soaked portion and unsoaked portion of the tube during the soaking operation, can be eliminated.

In the previous Examples, we have used ceramic composed of chromium oxide (5.0% by weight) and alumina (94.44% by weight) as a preferred material for producing the inner tube of the thermocouple protecting tube which is constructed either conventionally in or in accordance with this invention. However, we have found, as shown by the following Example that inner tubes containing chromium oxide in an amount of 1 to 35% by weight also perform well in carrying out the temperature measurement of molten steel.

EXAMPLE 5

Figure 7:
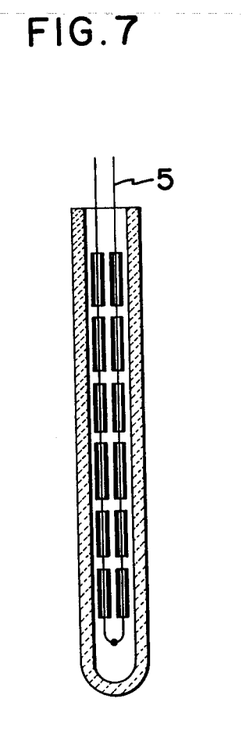
FIG. 7 is a front sectional view of an inner thermocouple protecting tube made of a mixture composed of chromium oxide (1 to 35% by weight) and alumina (99 to 65% by weight).

We have prepared thermocouple protecting tubes constructed as shown in FIG. 7 (all of them have the same outer diameter of 7 mm, and the same wall thickness of 1.5 mm), which are made by mixing different amounts of chromium oxide with alumina respectively as set forth below.

Then they were immersed into molten steel at about 1600° C., on which slag thereof has been floated, and were used for to the continuous measuring of temperature.

It must be noted that the above (inner) tubes were provided with neither outer tubes nor an intermediate insulating layer and that the above tubes had an outer diameter (7 mm) smaller than that (14 mm) of the foregoing Examples 1 to 4.

The results of the above Example are shown in the following chart:

| $Cr_2O_3$ (% by weight) | Lifetime (minutes) |
|---|---|
| 0 | 20 |
| 1 | 40 |
| 5 | 53 |
| 10 | 55 |
| 15 | 60 |
| 20 | 60 |
| 25 | 55 |
| 30 | 53 |
| 35 | 52 |
| 40 | Ruptured by thermal shock |
| 45 | Ruptured by thermal shock |

In the above Example, the temperature of the thermocouple element became equal to that of the molten steel about 40 seconds after the thermocouple protecting tube was dipped into the molten steel.

From the above chart, it has been found that:
(1) when the amount of $Cr_2O_3$ is less than 1% by weight, the lifetime of the tube is short,
(2) when the above $Cr_2O_3$ amount is more than 35% by weight, the tube ruptures.

Therefore, it can be understood that the amount of $Cr_2O_3$ should be from 1 to 35% by weight and preferably from 15 to 20% by weight. To be more specific, the optimal amount of $Cr_2O_3$ will be from 15 to 20% by weight.

It was also believed that although tubes containing $Cr_2O_3$ of 40% by weight and 45% by weight were sintered at 1900° C., this temperature was too low to sinter the tubes sufficiently.

Since the tubes had a high percentage of $Cr_2O_3$, their refractoriness was increased, so that the above sintering temperature (1900° C.) was too low to impart sufficient strength to the tubes to withstand the temperature of molten steel.

Therefore, it will be safe to say that if the sintering temperature of above tubes could be raised, the tubes of high $Cr_2O_3$ content (e.g. more than 40% by weight) could withstand the temperature of molten steel.

It may be possible to add MgO in addition to $Cr_2O_3$ as an agent for restraining the growth of crystal particles of $Cr_2O_3$. It is also possible to add CaO or $SiO_2$ in addition to MgO and $Cr_2O_3$, whereby the sinterability of the tube can be improved.

Additionally, another Example relating to the Example 5 has shown that tubes having a diameter of more than 10 mm frequently rupture due to thermal shock when they are subject to a molten body of about 1600° C.

As has been described, the thermocouple protecting tube of this invention can remarkably prolong the lifetime of a thermocouple, whereby continuous measurement of the temperature of a molten body can be achieved.

What we claim is:
1. In a thermocouple protecting tube for continuously measuring the temperature of molten steel comprising a single ceramic tube having one end closed and containing a thermocouple element therein, the improvement wherein said tube is comprised of chromium oxide in an amount of about 1 to 35% by weight and alumina in an amount of about 99 to 65% by weight, said chromium oxide and alumina being initially mixed together and sintered to form said ceramic tube.

2. In a thermocouple protecting tube comprising a single ceramic tube having one end closed and containing a thermocouple element therein, said tube being comprised of chromium oxide in an amount of about 1 to 35% by weight and alumina in an amount of about 99 to 65% by weight, said chromium oxide and alumina being initially mixed together and sintered to form said ceramic tube, said tube having heat resistant properties suitable for use in measuring the temperature of molten steel.

3. In a thermocouple protecting tube according to claim 1, wherein said tube has a diameter of less than 10 mm.

* * * * *